US012651808B2

(12) United States Patent
Maguire et al.

(10) Patent No.: US 12,651,808 B2
(45) Date of Patent: Jun. 9, 2026

(54) TRACTION BATTERY PACK HAVING ELECTRICALLY CONNECTED BATTERY CELLS AND BATTERY CELL JOINING METHOD

(71) Applicant: Ford Global Technologies, LLC, Dearborn, MI (US)

(72) Inventors: Patrick Daniel Maguire, Ann Arbor, MI (US); Michael E. Reibling, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 650 days.

(21) Appl. No.: 18/068,012

(22) Filed: Dec. 19, 2022

(65) Prior Publication Data

US 2024/0079736 A1     Mar. 7, 2024

Related U.S. Application Data

(60) Provisional application No. 63/403,445, filed on Sep. 2, 2022.

(51) Int. Cl.
H01M 50/211     (2021.01)
H01M 50/533     (2021.01)
(Continued)

(52) U.S. Cl.
CPC ....... H01M 50/536 (2021.01); H01M 50/211 (2021.01); H01M 50/533 (2021.01); H01M 50/553 (2021.01)

(58) Field of Classification Search
CPC ..... H01M 50/204–211; H01M 50/249; H01M 50/258–26; H01M 50/50–569
See application file for complete search history.

(56) References Cited

U.S. PATENT DOCUMENTS 8,486,557 B2     7/2013  Lee et al.
9,375,804 B2     6/2016  Lev
(Continued)

FOREIGN PATENT DOCUMENTS

DE     102008034867 A1 *  1/2010  .......... H01M 50/516
JP         2006066083 A *  3/2006  ............. Y02E 60/10
(Continued)

OTHER PUBLICATIONS

Machine translation of Nagayama, JP 2006-066083. Originally available Mar. 9, 2006. (Year: 2006).*
(Continued)

*Primary Examiner* — Nicole M. Buie-Hatcher
*Assistant Examiner* — Jacob Buchanan
(74) *Attorney, Agent, or Firm* — David B. Kelley; Carlson, Gaskey & Olds, P.C.

(57)     ABSTRACT

A method includes electrically connecting a first battery cell to a second battery cell by joining a first tab terminal of the first battery cell to a second tab terminal of the second battery cell. The method further includes compressing the first tab terminal and the second tab terminal after the joining. A battery assembly includes a first tab terminal extending from a first housing of a first battery cell, and a second tab terminal extending from a second housing of a second battery cell. The second tab terminal is connected directly to the first tab terminal. The method further includes an insulating layer that encloses the first and second tab terminals against the first and second housings.

1 Claim, 4 Drawing Sheets

(51) Int. Cl.
    *H01M 50/536*      (2021.01)
    *H01M 50/553*      (2021.01)

(56)           References Cited

U.S. PATENT DOCUMENTS

| 10,903,473 | B2 | 1/2021 | Guo et al. | |
| 2004/0050414 | A1* | 3/2004 | Oogami | H01M 50/503 |
| | | | | 136/244 |
| 2011/0045335 | A1* | 2/2011 | Lee | H01M 50/509 |
| | | | | 429/153 |
| 2011/0086242 | A1* | 4/2011 | Lee | H01M 50/566 |
| | | | | 429/7 |
| 2012/0015226 | A1 | 1/2012 | Kim et al. | |
| 2012/0171527 | A1* | 7/2012 | Hiroma | H01M 50/569 |
| | | | | 429/61 |
| 2012/0315531 | A1 | 12/2012 | Lev et al. | |
| 2013/0065103 | A1* | 3/2013 | Yumura | H01M 10/6555 |
| | | | | 361/522 |
| 2013/0130099 | A1* | 5/2013 | Lee | H01M 50/557 |
| | | | | 429/178 |

| 2015/0380697 | A1 | 12/2015 | Osborne et al. |
| 2016/0133906 | A1 | 5/2016 | Kedir et al. |
| 2017/0125775 | A1 | 5/2017 | Chen et al. |
| 2018/0287316 | A1 | 10/2018 | Robert et al. |

FOREIGN PATENT DOCUMENTS

| KR | 20210069426 | A | * | 6/2021 | ......... | H01M 50/572 |
| WO | 2012148100 | | | 1/2012 | | |

OTHER PUBLICATIONS

Machine translation of Meintschel, DE 102008034867. Originally available Jan. 28, 2010. (Year: 2010).*
Machine translation of Kim, KR-20210069426-A. Originally available Jun. 11, 2021. (Year: 2021).*
S. Shawn Lee, et al., Joining Technologies for Automotive Lithium-Ion Battery Manufacturing—A Review, Proceedings of the ASME 2010 International Manufacturing Science and Engineering Conference MSEC2010, Oct. 12-15, 2010, p. 1-9, Erie, Pennsylvania, USA.

\* cited by examiner

TRACTION BATTERY PACK HAVING ELECTRICALLY CONNECTED BATTERY CELLS AND BATTERY CELL JOINING METHOD

CROSS-REFERENCE TO RELATED APPLICATIONS

This application claims priority to U.S. Provisional Application No. 63/403,445, which was filed on 2 Sep. 2022 and is incorporated herein by reference.

TECHNICAL FIELD

This disclosure relates generally to electrically connecting battery cells of a traction battery, particularly pouch-style battery cells that have tab terminals.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. A traction battery of an electrified vehicle can include battery cells arranged in one or more arrays with an enclosure.

SUMMARY

In some aspects, the techniques described herein relate to a method, including: to electrically connect a first battery cell to a second battery cell, joining a first tab terminal of the first battery cell to a second tab terminal of the second battery cell; and after the joining, compressing the first tab terminal and the second tab terminal.

In some aspects, the techniques described herein relate to a method, wherein the joining includes welding the first tab terminal to the second tab terminal.

In some aspects, the techniques described herein relate to a method, wherein after the joining and compressing, the first tab terminal and the second tab terminal are disconnected from a busbar.

In some aspects, the techniques described herein relate to a method, further including, prior to joining the tab terminal of the second battery cell to the tab terminal of the first battery cell, folding the tab terminal of the second battery cell over the tab terminal of the first battery cell.

In some aspects, the techniques described herein relate to a method, wherein the first and second battery cells are pouch-style battery cells.

In some aspects, the techniques described herein relate to a method, wherein the first tab terminal extends from a first housing of the first battery cell, and the second tab terminal extends from a second housing of the second battery cell, wherein the first tab terminal and the second tab terminal are folded and compressed toward the first and second housings during the compressing.

In some aspects, the techniques described herein relate to a method, further including covering the first tab terminal and the second tab terminal with an insulative layer prior to the compressing.

In some aspects, the techniques described herein relate to a method, wherein the first and second battery cells are within a group of battery cells disposed along an axis, the insulative layer adhered directly to a housing of a battery cell at a first axial end of the group and to a housing of a battery cell at an opposite second end of the group.

In some aspects, the techniques described herein relate to a method, further including pressing against the insulative layer during the compressing to force air out from an area between the insulative layer and the first and second housings.

In some aspects, the techniques described herein relate to a method, wherein a cross-sectional area of the first tab terminal is different than a cross-sectional area of the second tab terminal.

In some aspects, the techniques described herein relate to a method, further including, to electrically connect a third battery cell to the second battery cell, joining a third tab terminal of the third battery cell to the first tab terminal of the first battery cell, the first tab terminal joined to the second tab terminal with a first weld, the first tab terminal joined to the third tab terminal with a second weld that is separate and distinct from the first weld.

In some aspects, the techniques described herein relate to a method, wherein the first and second welds are laser welds.

In some aspects, the techniques described herein relate to a method, wherein the first tab terminal and the second tab terminal are connected in series with the third tab terminal, wherein a cross-sectional area of the third tab terminal is greater than a cross-sectional area of the first tab terminal, and is greater than a cross-sectional area of the second tab terminal.

In some aspects, the techniques described herein relate to a battery assembly, including: a first tab terminal extending from a first housing of a first battery cell; a second tab terminal extending from a second housing of a second battery cell, the second tab terminal connected directly to the first tab terminal; and an insulating layer that encloses the first and second tab terminals against the first and second housings.

In some aspects, the techniques described herein relate to a battery assembly, wherein the first and second tab terminals are connected directly to each other with at least one weld.

In some aspects, the techniques described herein relate to a battery assembly, wherein the first and second tab terminals are disconnected from a busbar.

In some aspects, the techniques described herein relate to a battery assembly, wherein the first and second tab terminals are folded and compressed against the first and second housing when enclosed by the insulating layer.

In some aspects, the techniques described herein relate to a battery assembly, wherein the first and second battery cells are within a group of battery cells disposed along an axis, the insulative layer adhered directly to a housing of a battery cell at a first axial end of the group and to a housing of a battery cell at an opposite second end of the group.

In some aspects, the techniques described herein relate to a battery assembly, wherein the first and second battery cells are pouch-style battery cells.

In some aspects, the techniques described herein relate to a battery assembly, wherein a cross-sectional area of the first tab terminal is different than a cross-sectional area of the second tab terminal.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A battery pack assembly can include an enclosure assembly housing a plurality of battery cell arrays. Each of the arrays can include a plurality of battery cells. The battery cells are electrically connected together.

This disclosure details exemplary methods of electrically connecting together the battery cells without using busbars. The disclosure further details a battery assembly having battery cells electrically connected together without using busbars.

Figures 1, 2:
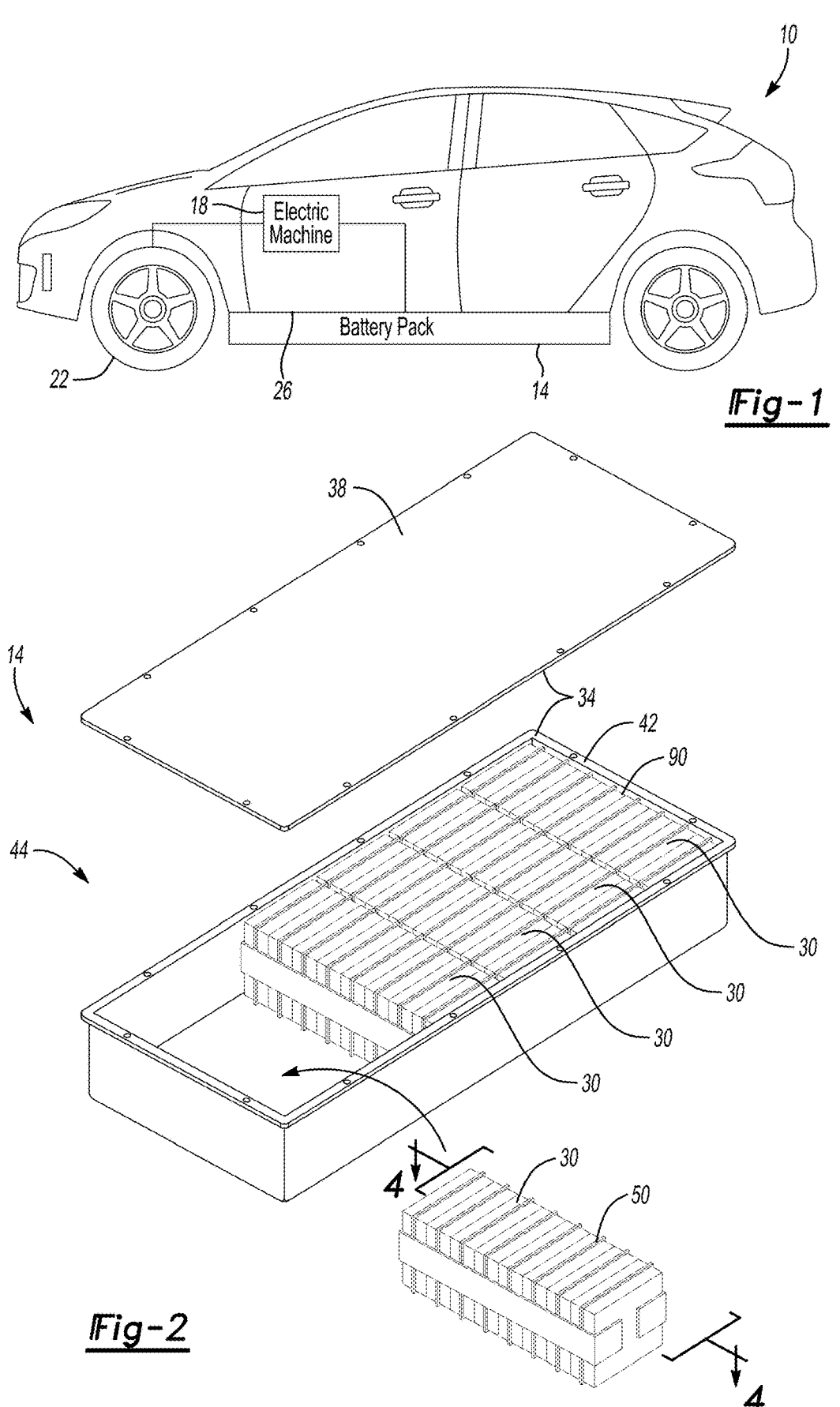
FIG. 1 illustrates a side view of an example electrified vehicle.
FIG. 2 illustrates an expanded, perspective view of a battery pack from the electrified vehicle of FIG. 2 and showing many arrays of the battery pack in a highly schematic form.

With reference to FIG. 1, an electrified vehicle 10 includes a battery pack 14, an electric machine 18, and wheels 22. The battery pack 14 powers an electric machine 18, which can convert electrical power to mechanical power to drive the wheels 22.

The battery pack 14 is, in the exemplary embodiment, secured to an underbody 26 of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a battery pack.

With reference now to FIG. 2, the battery pack 14 includes a plurality of arrays 30 held within an enclosure assembly 34. In the exemplary embodiment, the enclosure assembly 34 includes an enclosure cover 38 and an enclosure tray 42. The enclosure cover 38 is secured to the enclosure tray 42 to provide an interior area 44 that houses the arrays 30.

Each of the arrays 30 includes a plurality of battery cells 50 (or simply, "cells") disposed along an array axis. The battery cells 50 are stacked side-by side relative to each other along the array axis. The battery cells 50 store and supply electrical power.

Although a specific number of the arrays 30 are illustrated in the various figures of this disclosure, the battery pack 14 could include any number of the arrays 30 having any number of cells 50.

Figure 3:
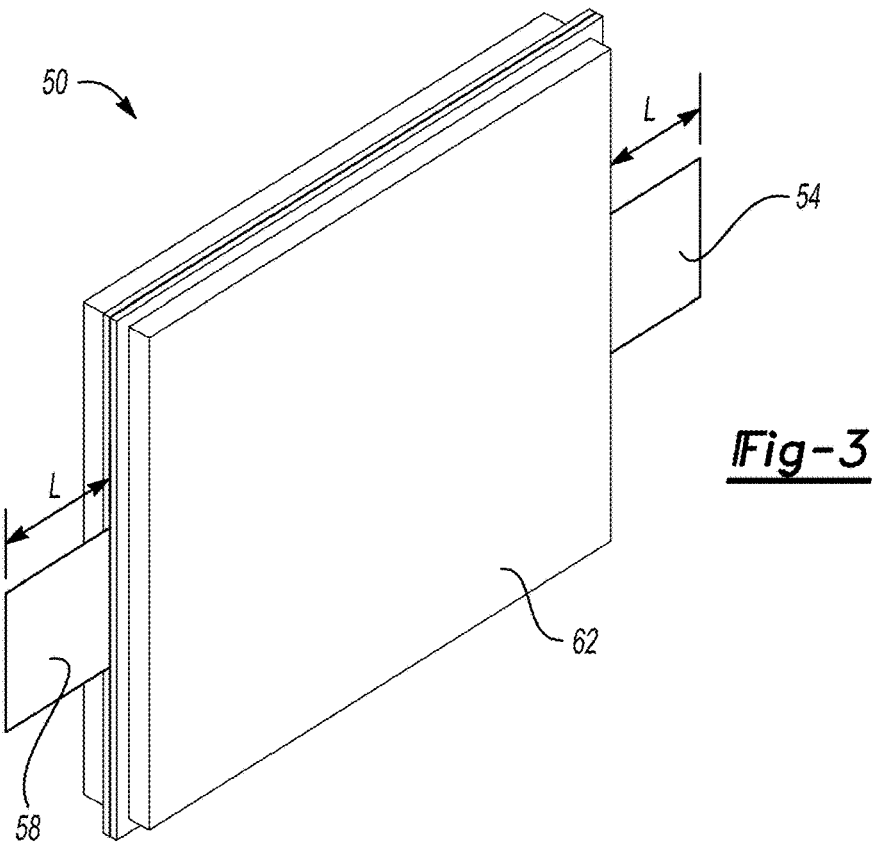
FIG. 3 illustrates a perspective view of a battery cell from one of the arrays in the battery pack of FIG. 2.

FIG. 3 illustrates one of the battery cells 50, which are prismatic pouch-style battery cells in this example. The battery cells 50 include a first tab terminal 54 and second tab terminal 58 extending from a housing 62. In an example, the housing 62 is a multi-layered structure including an aluminum film layer and a polymer portion.

In the past, terminals have been joined to busbars to electrically connect battery cells. In the exemplary battery pack 14, busbars that electrically connect to terminals are omitted. The first tab terminal 54 and second tab terminals 58 and instead joined to the tab terminals of other battery cells 50 with the array 30 to provide desired electrical connection. The first tab terminal 54 and the second tab terminal 58 are disconnected from any busbar.

Figure 4:
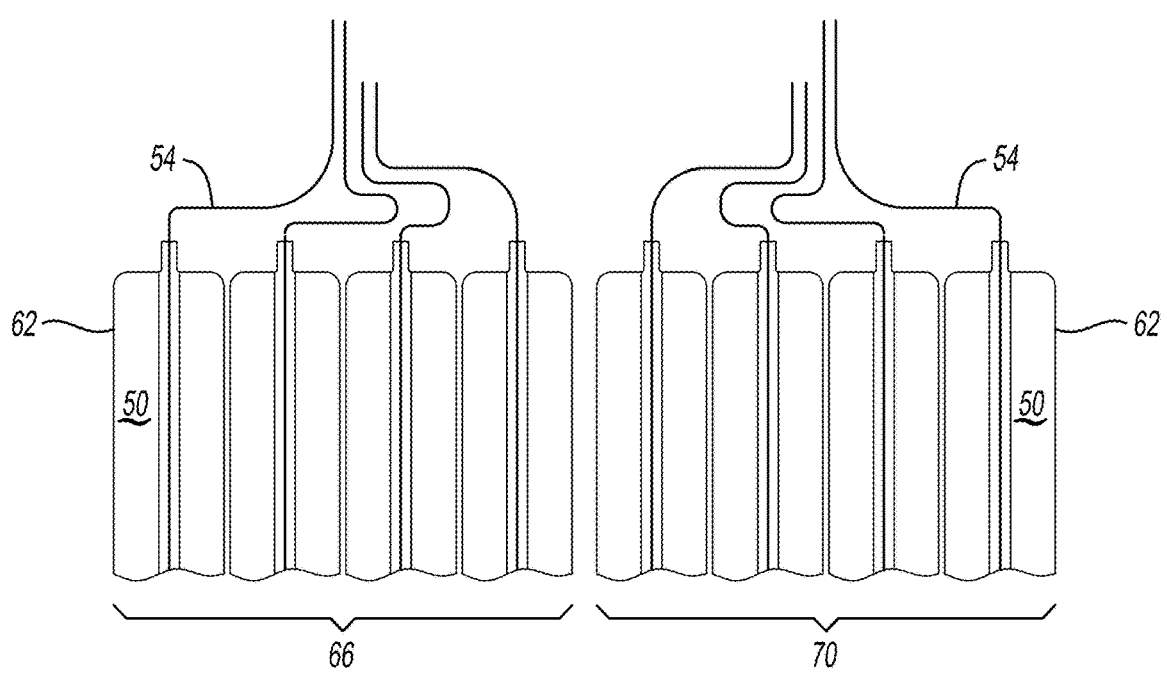
FIG. 4 illustrates a section view taken at line 4-4 in FIG. 2 prior to joining tab terminals of the battery cells within the array.

With reference to FIG. 4, the first tab terminals 54 extending from battery cells 50 in a first group 66 are electrically connected to each other and to the first tab terminals 54 extending from battery cell 50 in a second group 70. The first tab terminals 54 of the first group 66 can be positive and the first tab terminals 54 of the second group 70 negative.

Figure 5:
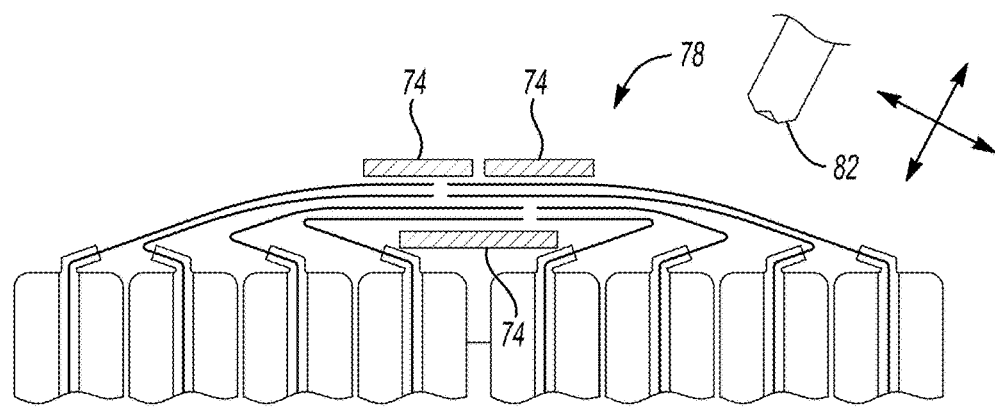
FIG. 5 illustrates the section view of FIG. 4 after the tab terminals are folded.

In the exemplary embodiment, in preparation for electrically connecting the first tab terminals 54, the first tab terminals 54 are folded and positioned within clamping members 74 of a clamping assembly 78 as shown in FIG. 5. The clamping members 74 help to consolidate the first tab terminals 54 for joining. Peripheral areas of the housings 62 can also be folded with the first tab terminals 54. In some examples, these areas of the housings 62 can be clipped or trimmed to facilitate folding.

After folding, the clamping members 74 are then actuated to compress and hold together the first tab terminals 54 of the first group 66 and the second group 70. The clamping members 74 hold together first tab terminals 54 in a position appropriate for joining.

In this example, welds join the first tab terminals 54. In particular, laser welds join the tab terminals. In other examples, the first tab terminals 54 joined in other ways, such as by spot welds. In still other examples, the first tab terminals 54 are joined in other ways, such as by clamping them together with the clamping members 74 which remain with the tab terminals 54.

When the clamping members 74 are holding the first tab terminals 54, electrodes 82 of a laser welder are moved into a position and apply laser welds to join the first tab terminals 54 at desired locations. The laser welds could extend through any number of the first tab terminals 54. That is, a single laser weld could join two of the first tab terminals 54, three of the first tab terminals 54, or another number of the first tab terminals 54. In an example, the four tab terminals 54 of the first group 66 could be directly welded to four tab terminals 54 of group 70 to avoid the need for staggering the tab end positions. After the joining—here by the laser welds—the clamping members 74 can be withdrawn as shown in FIG. 7.

Figure 6:
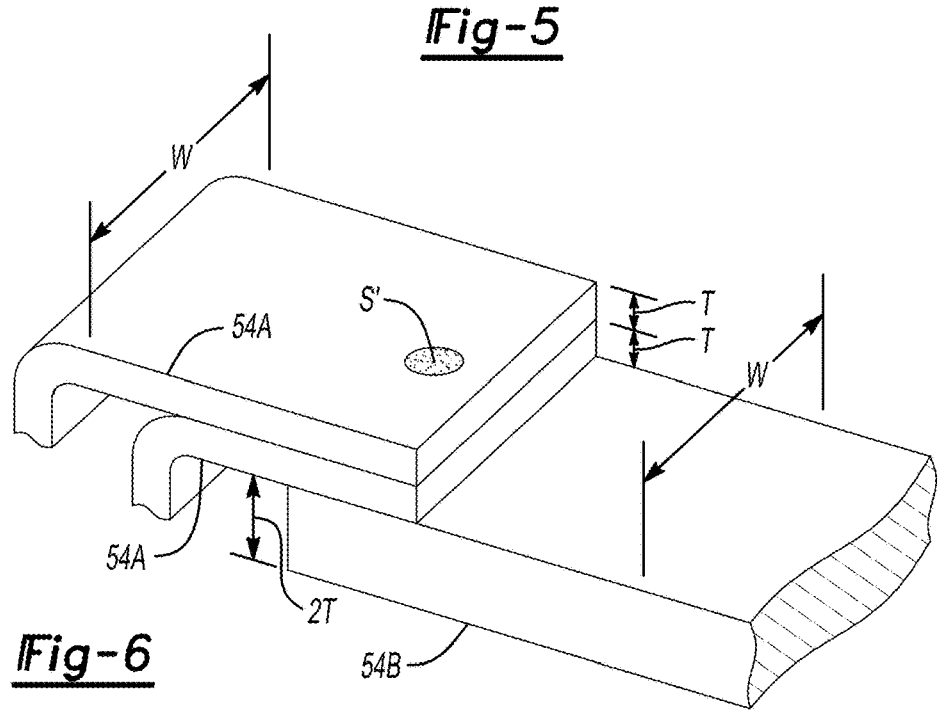
FIG. 6 illustrates a close-up view of a single tab terminal joined to two other tab terminals according to another exemplary aspect of this disclosure.

In some examples, the first tab terminals 54 of the battery cells 50 within the array 30 can have different cross-sectional areas. The cross-sectional areas can be varied to accommodate a desired current carrying capacity. For example, with reference to FIG. 6, a laser weld S' joins two of the first tab terminals 54A to the first tab terminal 54B so that the first tab terminals 54A are connected in series to the first tab terminal 54B. A width W of the first tab terminals 54A and the first tab terminal 54B is the same. However, a thickness of the first tab terminals 54A is different than a thickness of the first tab terminals 54B. In particular, a thickness of the first tab terminals 54A is T and a thickness of the first tab terminal 54B is 2T. The first tab terminal 54B thus has a cross-sectional area that is twice the cross-sectional area of the first tab terminals 54A. Varying the cross-sectional area helps to ensure that the first tab terminal 54B has adequate current carrying capability. The cross-sectional area is an axial cross-sectional area for purposes of this disclosure.

Figure 7:
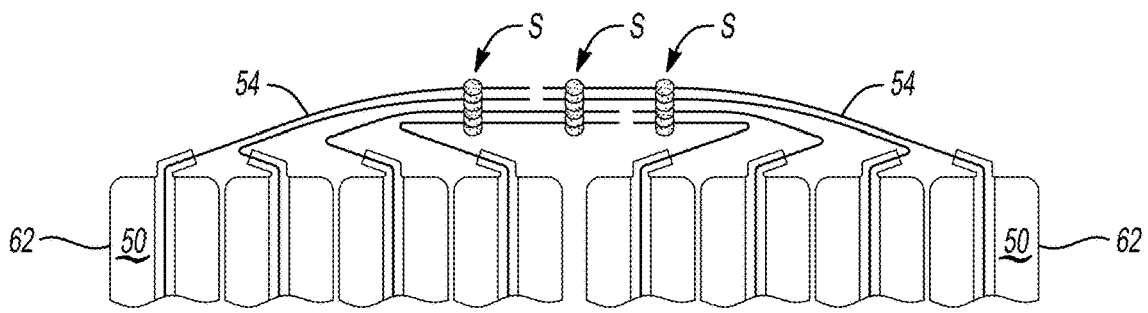
FIG. 7 illustrates the section view of FIG. 5 after the tab terminals are joined.

FIG. 7 shows the first tab terminals 54 after joining and after withdrawing the clamping members 74. In this example, three laser welds S join the first tab terminals 54. When joined in this way, the first group 66 is connected to the second group 70 in series. Notably, the first tab terminals 54 are electrically connected together without using any busbar.

With reference again to FIG. 3 and continuing reference to FIGS. 4 and 5, to facilitate proper positioning of the first tab terminals 54 during the joining, the array 30 could include battery cells 50 having first tab terminals 54 of different sizes. For example, the first tab terminals 54 of the battery cells 50 at the axial ends of the arrays 30 could be longer in a direction L that the first tab terminals 54 closer to the axial middle of the arrays 30. The first tab terminals 54 that are longer extend farther from the associated housing 62 than the first tab terminals 54 that are shorter. In another example, the tab terminals 54 could include folds that enable the adjustment of the lengths of the tab terminals 54.

Figure 8:
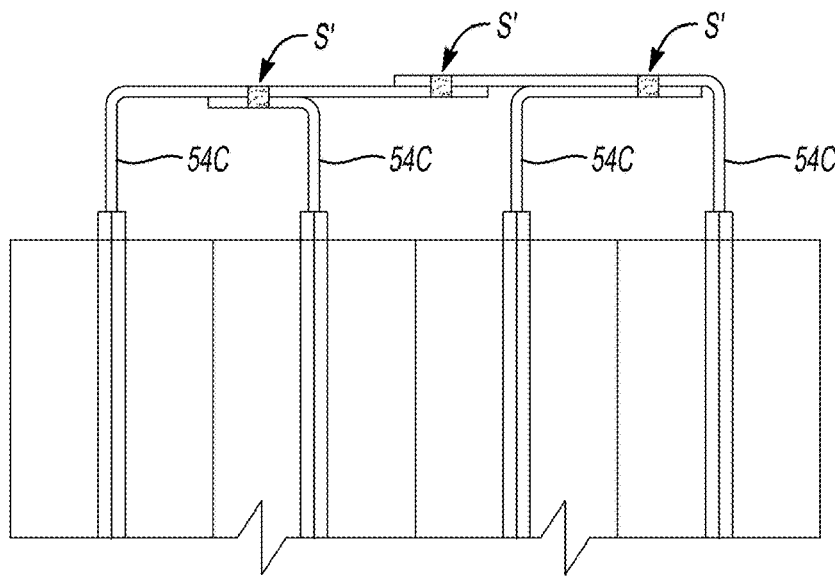
FIG. 8 illustrates yet another exemplary embodiment where tab terminals have varied lengths are joined with welds.

Adjusting the length can help to provide welding locations in a desired area. With reference to FIG. 8, first tab terminals 54C have varied lengths because welding through only two tab terminals 54C is desired, rather than welding through more than two tab terminals 54C. Welding through two tab terminals 54C may be desired to prevent burning through the tab terminals 54C during welding. In the example of FIG. 8, each weld S' joins two tab terminals 54C.

Figure 9:
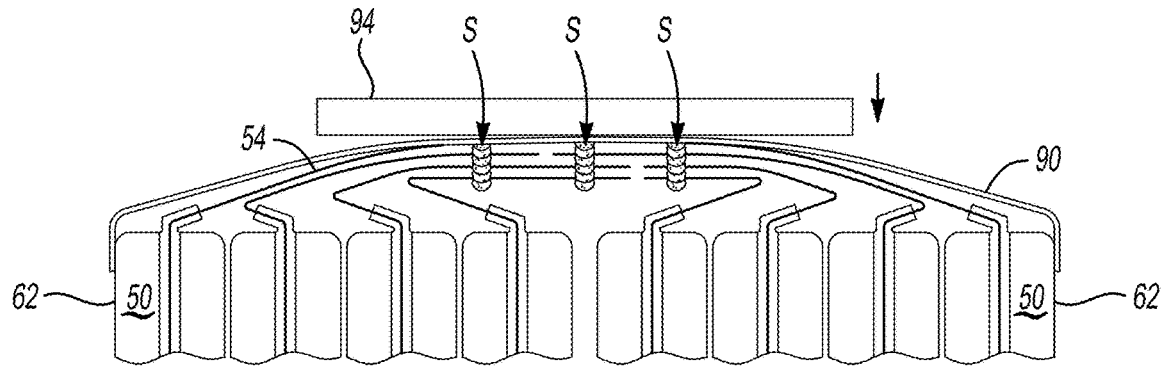
FIG. 9 illustrates the section view of FIG. 7 after the tab terminals are covered by an insulative layer.

With reference to FIG. 9, in the exemplary embodiment, after welding, an insulative layer 90 is applied to the array 30 to cover the first tab terminals 54. The insulative layer 90 can shield the first tab terminals 54 from contacting surrounding structures or other conductors. The insulative layer 90 can facilitate closely packing the arrays 30 within the enclosure assembly 34. For example, the insulative layer 90 can allow one array 30 be positioned within the enclosure assembly 34 right next to another array 30 without the two arrays 30 inadvertently electrically connecting to one another.

The insulative layer 90 can be a tape or polyester film that is directly attached to the housings 62 of the battery cells 50 at the first and second axial ends of the array 30. The polyester film can be secured to the housings with an adhesive. In another example, the insulative layer 90 could be a shrink-wrap or clinging film that does not include an adhesive.

Figure 10:
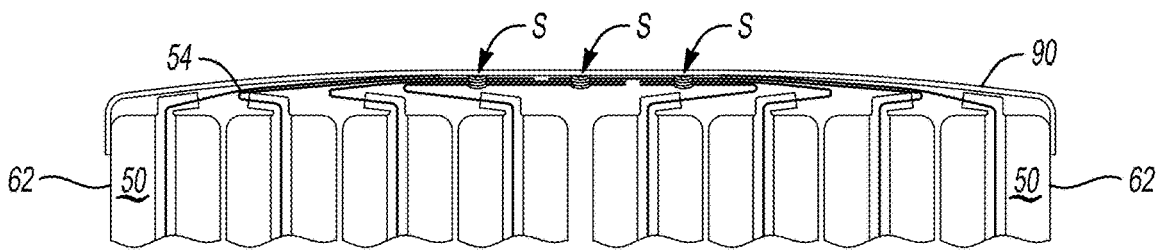
FIG. 10 illustrates the section view of FIG. 9 after the tab terminals are compressed against housings of the battery cells and held in the compressed position by the insulative layer.

The insulative layer 90 can help to hold the first tab terminals 54 in a compressed position against the housings 62. In some examples, a plunger 94 can be moved in a direction D to press the insulative layer 90 and the first tab terminals 54 against the housings 62 as shown in FIG. 10. After an adhesive that hold the insulative layer 90 cures, the plunger 94 can be removed. The insulative layer 90 then holds the first tab terminals 54 tightly against the housings 62.

Omitting busbars and compressing tab terminals can provide an array having a reduces packaging envelope when compared to arrays having busbars. The reduced packaging envelope can lead to a higher density battery system.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A method, comprising:

to electrically connect a first battery cell to a second battery cell, joining a first tab terminal of the first battery cell to a second tab terminal of the second battery cell;

after the joining, compressing the first tab terminal and the second tab terminal into a compressed position, wherein the first tab terminal extends from a first housing of the first battery cell, and the second tab terminal extends from a second housing of the second battery cell, wherein the first tab terminal and the second tab terminal are folded and compressed toward the first and second housings during the compressing; and holding the first tab terminal and the second tab terminal in a compressed position with an insulative layer, wherein the first and second battery cells are within a group of battery cells disposed along an axis, the insulative layer adhered directly to a housing of a battery cell at a first axial end of the group and to a housing of a battery cell at an opposite second end of the group, wherein the insulative layer comprises a film adhered directly and exclusively to the housings of the battery cells at the first and second axial ends of the group, and wherein a central portion of the film between the axial ends is not adhered to any cell housing and is placed in tension to hold the compressed tab terminals against the housings.

* * * * *